US00RE36342E

United States Patent [19]

McFadyen et al.

[11] E Patent Number: Re. 36,342

[45] Reissued Date of Patent: Oct. 19, 1999

[54] LOW DEADBAND MARINE HYDRAULIC STEERING SYSTEM

[75] Inventors: Andrew W. McFadyen, Richmond; James B. McBeth, N. Vancouver; Eric B. Fetchko, Burnaby, all of Canada

[73] Assignee: Teleflex (Canada) Ltd., Richmond, Canada

[21] Appl. No.: 08/721,525

[22] Filed: Sep. 26, 1996

Related U.S. Patent Documents

Reissue of:

[64] Patent No.: 5,349,818
Issued: Sep. 27, 1994
Appl. No.: 08/104,642
Filed: Aug. 11, 1993

[51] Int. Cl.[6] ..... F16D 31/02

[52] U.S. Cl. ..... 60/385; 91/420; 137/106

[58] Field of Search ..... 60/385; 91/420; 137/106, 599

[56] References Cited

U.S. PATENT DOCUMENTS

| | | | |
|---|---|---|---|
| 2,401,258 | 5/1946 | Livers | 137/144 |
| 2,483,312 | 9/1949 | Clay | 277/3 |
| 3,145,734 | 8/1964 | Lee et al. | 91/420 |
| 3,576,192 | 4/1971 | Wood et al. | 137/102 |
| 3,596,566 | 8/1971 | Krehbiel et al. | 91/420 |
| 3,613,508 | 10/1971 | Krehbiel et al. | 91/420 |
| 3,908,687 | 9/1975 | Wood | 137/106 |
| 3,933,167 | 1/1976 | Byers, Jr. | 91/420 X |
| 4,006,663 | 2/1977 | Baatrup et al. | 91/29 |
| 4,012,031 | 3/1977 | Mitchell et al. | 269/325 |
| 4,192,338 | 3/1980 | Gerulis | 137/106 |
| 4,461,314 | 7/1984 | Kramer . | |
| 4,669,494 | 6/1987 | McBeth | 137/106 |
| 5,018,935 | 5/1991 | Gage | 414/729 |
| 5,036,750 | 8/1991 | Katayama | 91/464 |
| 5,183,071 | 2/1993 | Ogawa | 137/106 |

FOREIGN PATENT DOCUMENTS

| | | | |
|---|---|---|---|
| 55-94068 | 7/1980 | Japan | 137/106 |

*Primary Examiner*—Stephen M. Hepperle
*Attorney, Agent, or Firm*—Howard & Howard

[57] ABSTRACT

A lock valve for marine hydraulic steering systems includes a valve body with a spool valve reciprocatingly received in a bore therein. A first port and a second port of the valve are connected to a manual pump. A third port and fourth port are connected to a double acting hydraulic cylinder connected to a rudder or steerable motor. There are valves within the lock valve which normally prevent fluid flowing between the ports so the steering system remains in a fixed position when the helm is released. Fluid can flow from the first port to the third port when the first port is pressurized. A return flow of fluid from the fourth port to the second port is permitted only when the first port is pressurized. When the second port is pressurized, fluid can flow the second port to the fourth port. A return flow of fluid from the third port to the first port is permitted only when the second port is pressurized. The return flow of fluid on at least one side of the valve is controlled by passageways normally blocked by the valve spool which are uncovered when the valve spool is deflected by pressurized fluid at the first port or second port.

26 Claims, 5 Drawing Sheets

LOW DEADBAND MARINE HYDRAULIC STEERING SYSTEM

Matter enclosed in heavy brackets [ ] appears in the original patent but forms no part of this reissue specification; matter printed in italics indicates the additions made by reissue.

BACKGROUND OF THE INVENTION

1. Field of the Invention

This invention relates to marine hydraulic steering systems and hydraulic lock valves used in conjunction therewith.

2. Description of Related Art

Hydraulic steering systems are preferred on small pleasure and fishing boats instead of the more usual cable steering systems. A problem is encountered however in conventional hydraulic steering systems when they are used on high power boats in particular. Such systems normally include a reversible rotary pump which is mechanically coupled to the steering wheel. Hydraulic lines extend from this manual pump to a hydraulic cylinder attached to the outboard motor or inboard/outboard motor. However a high force is exerted on the cylinder, and consequently on the steering wheel, by the rudder or engine torque. Accordingly, the boater must maintain a hold or the wheel to keep the boat on course. In the event that the boater releases the steering wheel, a dangerous hard-over motion of the engine can result. This can even throw a person out of the boat or cause the boat to circle back and run over a person who has fallen out of the boat.

For these reasons, it is conventional to provide hydraulic steering systems for high powered boats with lock valves. Conventional lock valves are often included in the same housing as the pump connected to the steering wheel, but they could be separate and located in different places such as the back of the boat near the motor. Conventionally these valves include two ports which are connected to the pump and two ports which are connected to the cylinder for two line hydraulic systems. In such systems the two ports on the pump alternate as intake and discharge ports depending upon the direction the steering wheel is turned. The lock valve usually includes an internal spool valve and two check valves or popper valves. When the wheel is rotated, pressurized fluid from the pump enters one of the ports on the lock valve. The pressurized fluid forces open one of the check valves or poppet valves, thus allowing the fluid to discharge from one of the ports towards the hydraulic cylinder. Hydraulic fluid returning from the other side of the cylinder must reach the intake side of the pump. Normally this flow is blocked by the other check valve. However, the spool valve is shifted by the pressurized fluid from the pump and pushes against the second check valve, opening a return passageway for fluid.

However, there is an inherent problem encountered with conventional hydraulic steering systems including such lock valves. The steering wheels are initially unresponsive and must be turned a considerable amount, often 47°–82° or more depending upon the type of system and equipment, before the rudders or engines respond. Boaters find this a great inconvenience as it does not provide the immediate turning response required for high powered boats such as bass boats. In an effort to do away with the deadband, boaters often resort to hydraulic steering systems without a lock valve at all or to cable steering systems. They prefer the inconvenience of holding the wheel to maintain course, even with the inherent dangers discussed above, rather than have to deal with unresponsive steering system with large degrees of deadband.

This problem has been recognized for some time and numerous attempts have been made to minimize the thought that the volume of fluid required to move the spool was the source of the problem. Thus much of the effort focused on reducing the movement of the spool valve. Attempts were also made to reduce the spool diameter to cut the volume of fluid flow. Also the check valves were moved closer together so the spool only had to move very small amounts to unseat the check valves. However this did not reduce the deadband significantly and also required close machining tolerances and therefore made the valves expensive.

Another problem encountered with previous lock valves is chatter which occurs when the helm is steered in the same direction the load is acting. The spool in the valve oscillates back and forth, contacting the balls of the check valves and opening and closing the ball under load. The resulting pressure spikes and impact of the spool on the balls and spool stops can cause a disconcertingly loud chattering noise. Steering performance is also diminished.

SUMMARY OF THE INVENTION

The applicant however perceived that the real problem was not the volume of fluid used to move the valve spool. Instead, the problem was centered on the requirement that the system be pressurized in order to unseat the check vale on the return side of the lock valve. When the steering wheel is turned, the discharge side of the pump forces fluid into the lock valve and the pressure of the fluid itself opens the check valve on the discharge side of the lock valve. However, the return fluid from the other side of the hydraulic cylinder must pass through the return side of the lock valve and enter the return side of the pump. In order for this to occur, the spool in the lock valve must be forced against the check valve on the return side with enough force to open it. The force must be sufficient to overcome the pressure acting against the check valve by the fluid in the return line from the cylinder. This pressure may be significant, particularly on the side carrying the prevailing load due to the rudder or motor torque.

Moreover, the problem is exacerbated by the fact that the system must be pressurized all the way along the hydraulic lines between the pump and the cylinder. This need to pressurize the system leads to the significant deadband described above.

It is therefore an object of the invention to provide an improved marine steering hydraulic steering system and lock valve without the large amount of deadband encountered in prior art systems employing lock valves.

It is also an object of the invention to provide an improved marine steering system which is responsive to relatively small degrees of rotation of the helm, but which locks the steering wheel in position when released.

It is a further object of the invention to provide an improved marine hydraulic steering system which is simple in construction, economical to produce and reliable in operation.

It is still a further object of the invention to provide an improved lock valve for marine steering systems which operates without the chatter sometimes encountered in prior art units.

In accordance with these objects, one aspect of the invention provides a hydraulic control apparatus which includes a reversible, manual pump having two ports. There is a lock valve having a body with a bore and a valve spool reciprocatingly received within the bore. A first port of the valve is connected to one of the pump ports. A second port of the lock valve is connected to another pump port. The lock valve also has third and fourth ports. The lock valve permits a flow of fluid from the first port to the third port when the first port is pressurized. It permits a fluid flow from the third port to the first port only when the second port is pressurized. The lock valve permits a fluid flow from the second port to the fourth port when the second port is pressurized and permits a flow of fluid from the fourth port to the second port only when the first port is pressurized. There is a passageway between the first port and the third port with a one way valve therein. There is a second passageway having a first portion extending from the fourth port to the bore and a second portion extending from the bore to the second port. The spool normally blocks fluid flow between the two portions. The spool has an opening which interconnects the two portions when the spool is shifted in one direction. There is a third passageway extending from the first port to the bore adjacent a first end of the spool to shift the spool in the one direction when the first port is pressurized.

Another aspect of the invention provides a lock valve which includes a body and a spool valve in the body with a bore and a valve spool reciprocatingly received therein. The spool has a passageway. There is first means for normally blocking a fluid flow between the ports. Second means permits a fluid flow from the first port to the third port when the first port is pressurized. Third means permits a fluid flow from the third port to the first port when the second port is pressurized. There is fourth means for permitting a fluid flow from the second port to the fourth port when the second port is pressurized. Fifth means permits a flow of fluid from the fourth port to the second port when the first port is pressurized. A first passageway extends from the fourth port to the bore. A second passageway extends from the bore to the second port. Flow between the fourth port and the first port is normally blocked by the valve spool. The fifth means includes a third passageway from the first port to the bore adjacent one end of the spool, whereby the spool is shifted in a first direction when the first port is pressurized. A fourth passageway in the spool valve interconnects the first passageway and the second passageway through the bore when the spool is so shifted in the first direction.

The invention overcomes problems associated with the prior art by allowing a return flow of fluid from the hydraulic cylinder to the steering pump without requiring sufficient pressure on the valve spool to unseat a check valve against the pressure of fluid acting on the return line from the cylinder. Instead, the return line is opened by the simple shifting of the valve spool itself by hydraulic pressure from the discharge port of the pump. The movement of the spool opens a passageway through the spool valve itself for the return flow of fluid to the pump. Thus the degree of pressurization is significantly reduced. In fact, the deadband has been reduced to only 4°–9° in embodiments of the invention. In other words, the deadband has been reduced approximately 90% compared with prior art hydraulic steering systems using a conventional lock valve. At the same time, the invention permits the lock valve to be manufactured with relatively minor modifications to conventional lock valve designs, thus removing the need for radical new tooling or completely different hydraulic steering systems to overcome the problems. Virtually the same components can be used as in the past with relatively small changes to the passageways in the lock valve and the function of the spool thereof. Furthermore, chatter is virtually eliminated by the invention since the valve spool is normally spaced-apart from any adjacent check balls.

DESCRIPTION OF THE PREFERRED EMBODIMENTS

Figure 1:
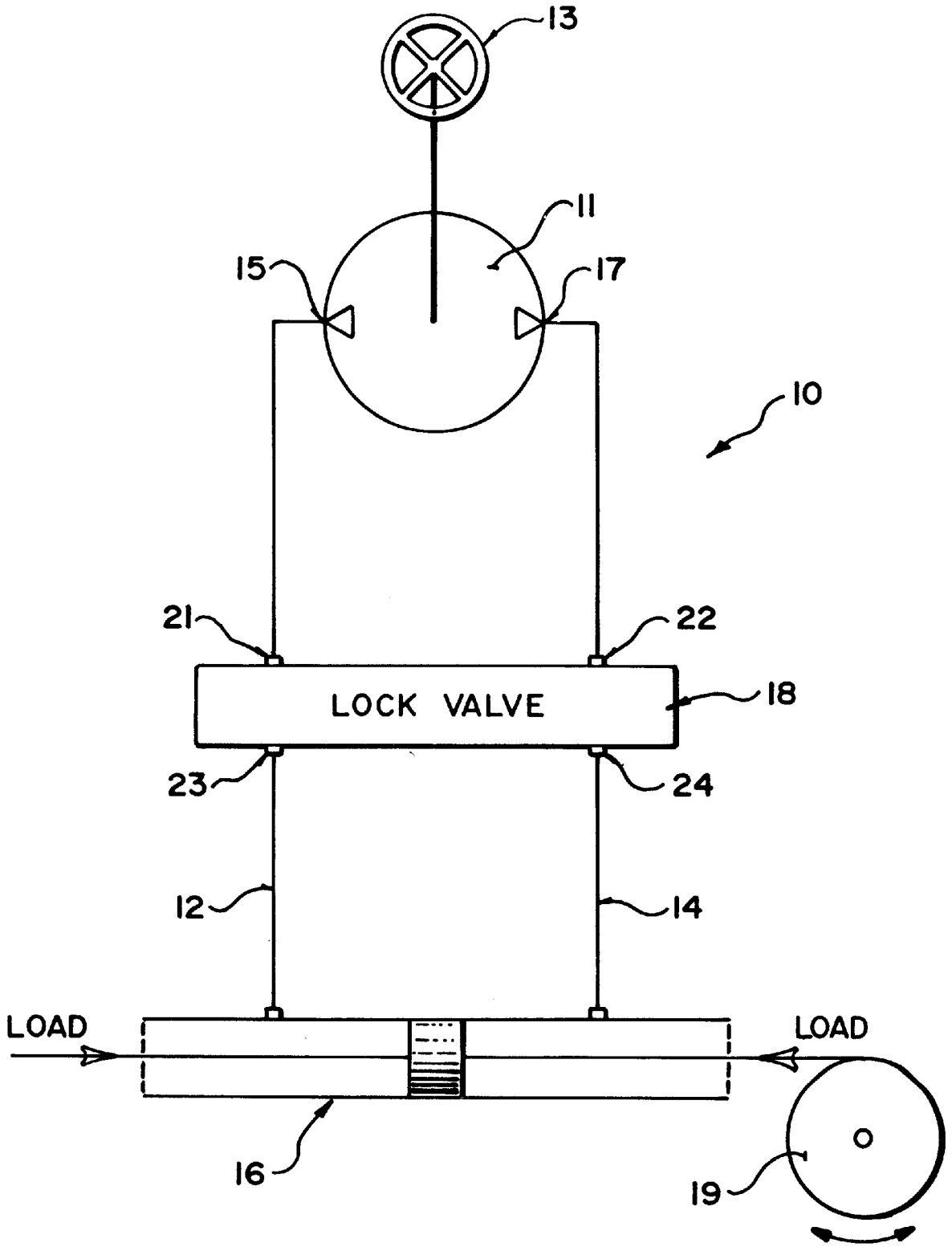
FIG. 1 is a schematic diagram of an hydraulic system according to an embodiment of the invention.

FIG. 1 shows an hydraulic steering system 10 of the type typically used on small pleasure craft and fishing boats. These systems include a rotary pump 11 which is rotated by means of a steering wheel 13. The particular pump 11 shown in FIG. 1 is of the two port type, having ports 15 and 17 which serve as intake ports and discharge ports for hydraulic fluid depending upon the direction the steering wheel 13 is turned. For example, if steering wheel 13 is rotated clockwise, port 17 acts as a discharge port and pumps hydraulic fluid. Port 15 acts as an intake port in this instance. The ports reverse their function when the wheel is rotated counter-clockwise.

The ports 15 and 17 are connected to opposite sides of a double acting hydraulic cylinder 16 by hydraulic lines 12 and 14. The cylinder 16 in this example is coupled to an outboard motor 19 and causes the motor to rotate to steer the boat.

Alternatively it could be connected to an inboard/outboard motor or to a rudder. There is 2 lock valve 18 in the system which has a first port 21, a second port 22, a third port 23 and a fourth port 24. The function of lock valve 18 is similar to prior art lock valves. It stops a flow of fluid through hydraulic lines 12 and 14 except when port 21 or port 22 is pressurized according to the direction in which steering wheel 13 is rotated. If the steering wheel is released, then the lock valve prevents a flow of fluid through lines 12 and 14 and hence keeps cylinder 16 and motor 19 in the set position.

Figure 2:
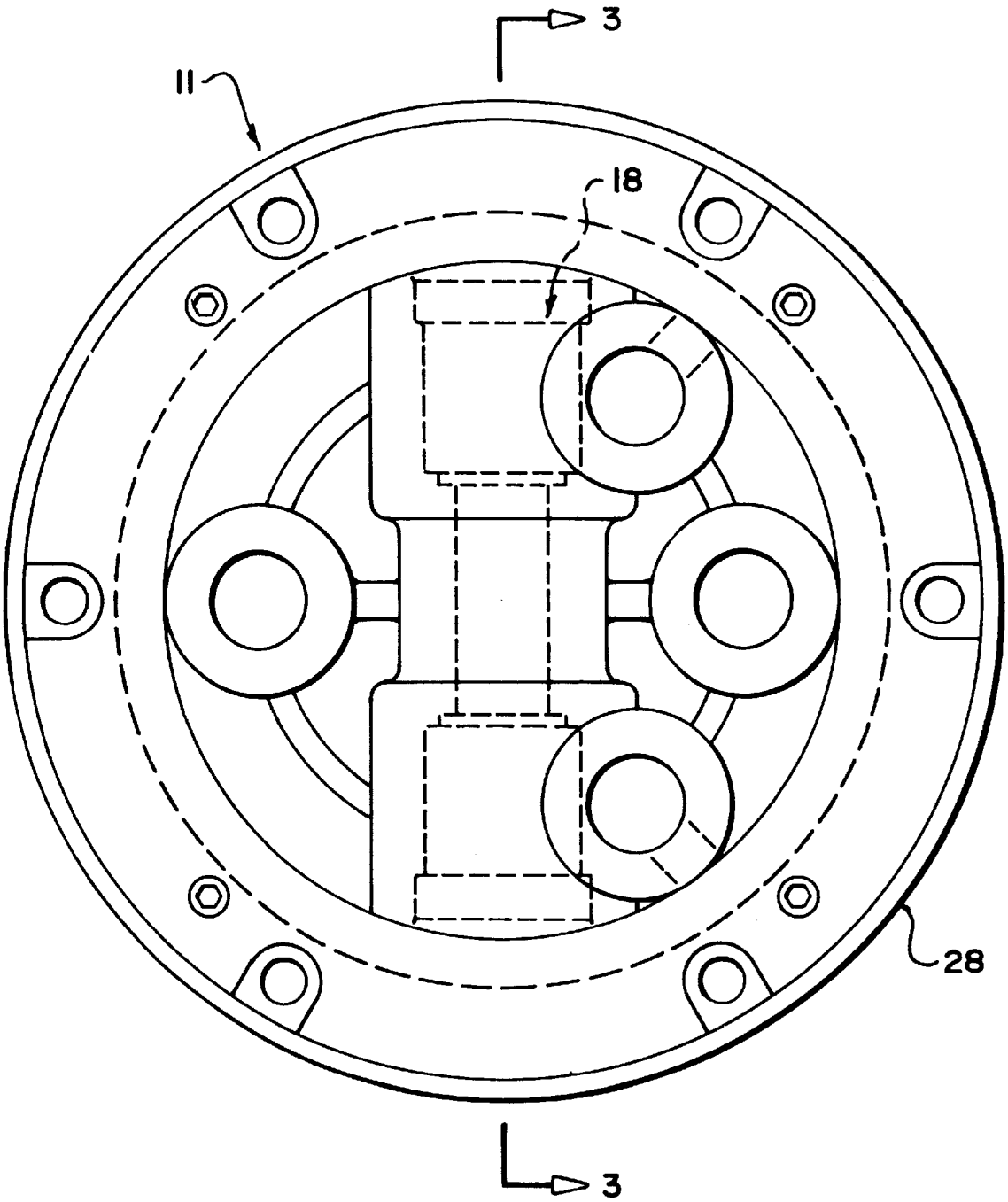
FIG. 2 is a front elevation of the combined steering pump and lock valve thereof.
Figure 3:
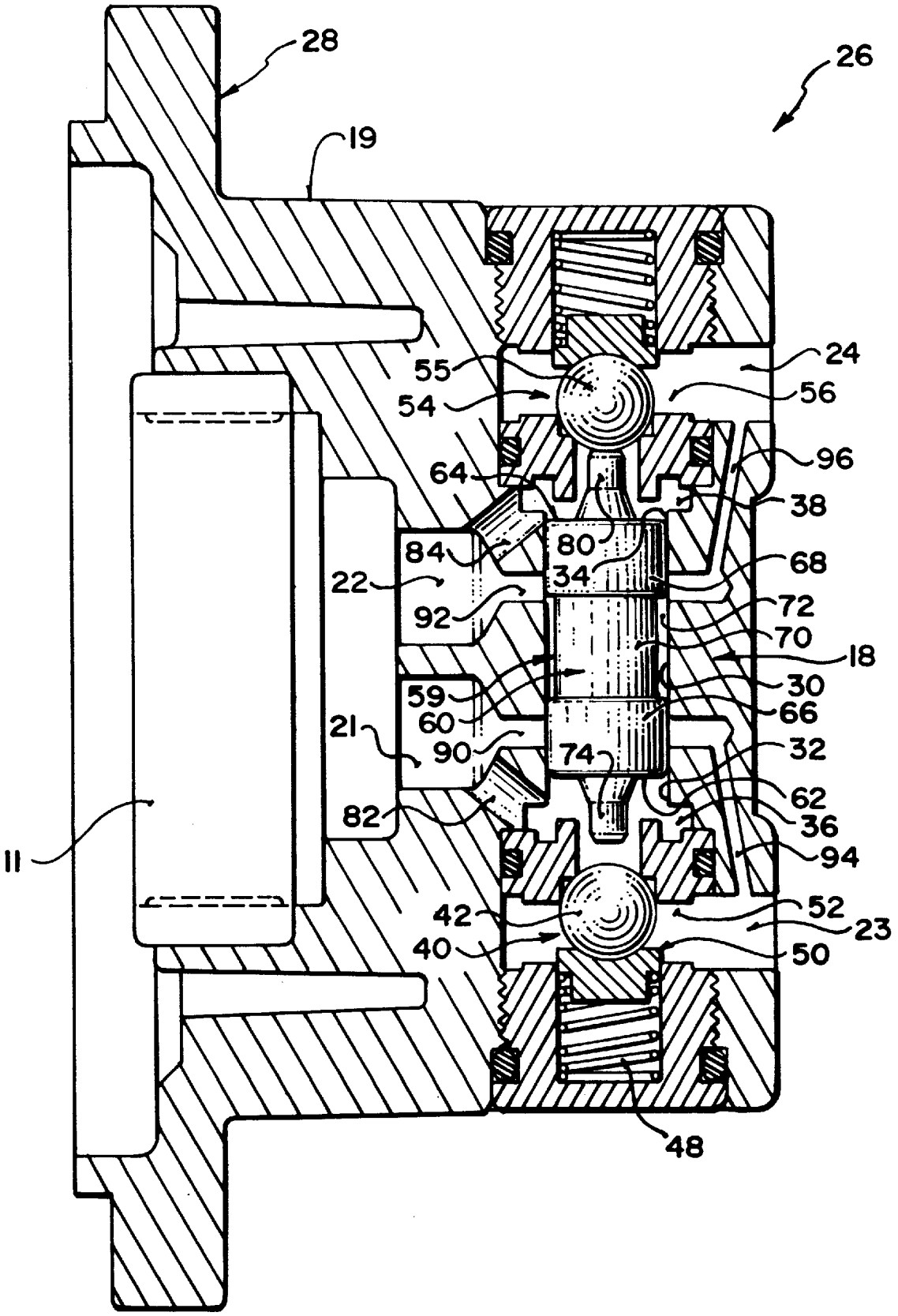
FIG. 3 is a sectional view taken along line 3—3 of FIG. 2.

Although shown schematically in FIG. 1 as two separate parts, the steering pump 11 and lock valve 18 are combined in a single pump unit 26 in the embodiment shown in FIG. 2 and 3. The unit is in a generally cylindrical housing 28.

Lock valve 18 is located within housing 28 rearwardly of the pump 11 having a body 19. Ports 21 and 22 are connected to the pump, while ports 23 and 24 are connected to the cylinder 16 shown in FIG. 1. There is a cylindrical bore 30 within the housing which has a first end 32 and a second end 34. There is a chamber 36 for hydraulic fluid adjacent end 32 and a corresponding chamber 38 adjacent end 34. A first ball-type check valve 40 includes a ball 42 which is resiliently biased towards chamber 36 by a coil spring 48 pressing on a cup fitting 50 which engages the ball. The structure of the check valve is conventional and therefore is not described in more detail. Other types of one-way valves could be employed such as popper valves.

There is a passageway 52 extending from port 23 to the check valve 40 which communicates with chamber 36 when the check valve is open. It may be observed that the check valve permits fluid to flow from chamber 36 to port 23 when the ball is unseated by pressure in the chamber 36 sufficiently great to overcome the force of spring 48 plus any pressure acting on ball 42 due to pressure in the return line connected to port 23. However, the check valve prevents pressurized fluid at port 23 from forcing the valve open and entering chamber 36. Therefore a fluid flow from port 23 to chamber 36 past the ball valve can only be accomplished when the check valve is otherwise opened.

There is another check valve 54 adjacent chamber 38 having a ball 55. The structure is the same as check valve 40. There is a passageway 56 extending from port 24 to the check valve 40. The check valve is opened when there is sufficient pressure in chamber 38 to allow fluid to flow from the chamber to port 24. However, the ball valve cannot be unseated by pressurized fluid at port 24 and therefore acts to prevent fluid from flowing from port 24 to chamber 38 and port 22 unless the check valve is opened by some other means.

There is a spool valve 59 having a spool 60 reciprocatingly received within the bore 30. The spool has a first end 62 and a second end 64. There is a first end portion 66 adjacent end 62 having an outer circumference which slidingly and sealingly engages the bore 30. There is a second end portion 68 adjacent end 64 which also slidingly and sealingly engages the wall of the bore. The spool has a center portion 70 which is smaller in diameter than the end portions, therefore leaving an annular passageway 72 between this portion of the valve spool and the bore.

There is a protrusion 74 connected to end portion 66. The protrusion is coaxial with the bore 30 and the valve spool, as is check valve 40. It may be seen that protrusion 74 can contact the ball 42 to unseat the ball when the valve spool is moved towards ball 42 with sufficient force.

The opposite end of the valve spool has a protrusion 80 which is similar to protrusion 74. Protrusion 80 can likewise unseat the ball 55 of ball valve 54 when pressed against the ball with sufficient force.

There is a passageway 82 which extends from port 21 to chamber 36. Likewise there is a passageway 84 which extends from port 22 to chamber 38. These passageways allow pressurized hydraulic fluid to enter the chambers from the pump ports 21 and 22.

As described thus far, the lock valve 18 is generally similar in structure to some prior art lock valves also adapted for use on marine hydraulic steering systems. However, valve 18 has an additional passageway 90 which extends from port 21 to bore 30 adjacent end portion 66 of the valve spool. When the valve spool is centered, passageway 90 is covered by end portion 66, thus blocking fluid from flowing from port 21 into bore 30. Likewise there is passageway 92 extending from port 22 to bore 30 adjacent end portion 68 of the valve spool. Again, when the valve spool is centered, that is at an equal distance between the ball valves, the passageway 92 is covered by end portion 66, thus preventing hydraulic fluid from flowing from port 22 into the bore.

There is another passageway 94 which extends from port 23 to bore 30 ad adjacent end portion 66 and generally opposite bore 90. Again, passageway 94 is covered by end portion 66 of the valve spool when centered. There is another passageway 96 extending from port 24 to bore 30 adjacent end portion 68 of the valve spool generally opposite passageway 92. Again, passageway 96 is blocked by end portion 68 when the valve spool is centered, preventing hydraulic fluid from flowing to or from the bore 30 through the passageway.

Operation

The operation of valve 18 and system 10 can be understood by referring to FIG. 1 and 3. When steering wheel 13 is released, and therefore no pressurized fluid is pumped towards ports 21 or 22 of the lock valve from the pump 11, the valve spool 60 is centered with an approximately equal gap between each of the protrusions 74 and 80 and the respective check valves. In this position of the valve spool, there can be no fluid flow through the lock valve. The passageways 90, 92, 94 and 96 communicating with the bore 30 are blocked by the end portions 66 and 68 of the valve spool. At the same time, check valve 40 is seated, thus blocking the flow of fluid in either direction between chamber 36 and port 23 past the check valve. Likewise, check valve 54 is seated, thus preventing a flow of fluid between chamber 38 and port 24 past the valve. Because no fluid can flow past the valve, the cylinder, 16 shown in FIG. 1 is held in position, thus ensuring that the motor 19 or rudder are kept in position on course without any force being applied to the steering wheel 13.

When the steering wheel 13 is turned, pressurized fluid is pumped from pump 11, for example out of port 15. This provides pressurized fluid at port 21 of the lock valve 18. Chamber 36 is pressurized through passageway 82 and this tends to unseat ball 42 so fluid flows towards port 23. However, this flows of fluid from port 23 to the left side of cylinder 16 from the point of view of FIG. 1, cannot commence until a return flow of fluid can pass through the lock valve 18 from port 24 to port 22. In prior art lock valves of this general type, this was accomplished by the pressurized fluid in chamber 36 acting on first end 62 of the valve spool 60, thus pushing the spool against ball 55 of check valve 54 as shown in the position of FIG. 3. The fluid pressure in chamber 36 must be sufficient to force ball 55 open against the pressure of fluid acting in the opposite direction on the ball valve from port 24. As discussed above, this fact largely contributed to the deadband encountered in prior art steering systems of the type.

However, in the new lock valve 18, a return flow of fluid from port 24 to port 22 does not depend upon the valve spool forcing open check valve 54. Instead, passageway 96 from port 24 can communicate with passageway 92 extending to port 22 wheel the valve spool 60 is moved towards chamber 38 by pressurized fluid in 60 chamber 36. When this occurs, passageway 72 extending about the center portion 70 of the valve spool extends between passageways 92 and 96 as seen in FIG. 3. Thus returning fluid from the right side of cylinder 16, from the point of view of FIG. 1, can enter port 24, pass through passageways 96, 72 and 92 and then exit from port 22 of the lock valve to re-enter the pump at port 17 shown in FIG. 1. Ball valve 40 opens only after the return flow through passageways 92 and 96 is permitted. Then the fluid is free to pass through the lock valve in both directions.

However, when protrusion 80 contacts the ball 55 of check valve 54, and is moved further towards the valve by the pressure in chamber 36, the check valve is opened more, allowing a higher volume of fluid to pass through passageway 56, past the valve and into chamber 38. The fluid passes from chamber 38 and through passageway 84 to port 22. Because the pressure at port 24 was previously relieved by the flow of fluid through passageway 96, the check valve is initially opened with much less fluid pressure than in previous embodiments where no fluid flow at all is possible until the check valve is forced open by the protrusion on the valve spool. When the boater stops turning the steering wheel, [lead] *load* pressure is communicated through port 24, passageways 96, 72, 92 and 84 into chamber 38 where the [lead] *load* pressure acts against the end 64 of spool 60 such that the spool moves away from chamber 38 until it is approximately centered and the passageways 96 and 92 are closed off by the spool end 68.

When the boat is steered in the opposite direction, fluid is discharged from pump 11 through port 17 and enters the lock valve through port 22. Chamber 38 is pressurized by fluid entering the chamber through passageway 84. This has the effect of shifting the valve spool towards check valve 40. Passageway 72 about the center portion of the valve spool then becomes aligned with passageways 90 and 94, allowing return fluid from the left side of the cylinder, from the point of view of FIG. 1 to pass around the check valve aria port 23, passageway 94, passageway 72 and passageway 90. A greater flow of fluid is allowed when the protrusion 74 forces open check valve 40, allowing an additional volume of fluid to pass through port 23, passageway 52, chamber 36 and passageway 82.

Variations and Alternatives

Figure 4:
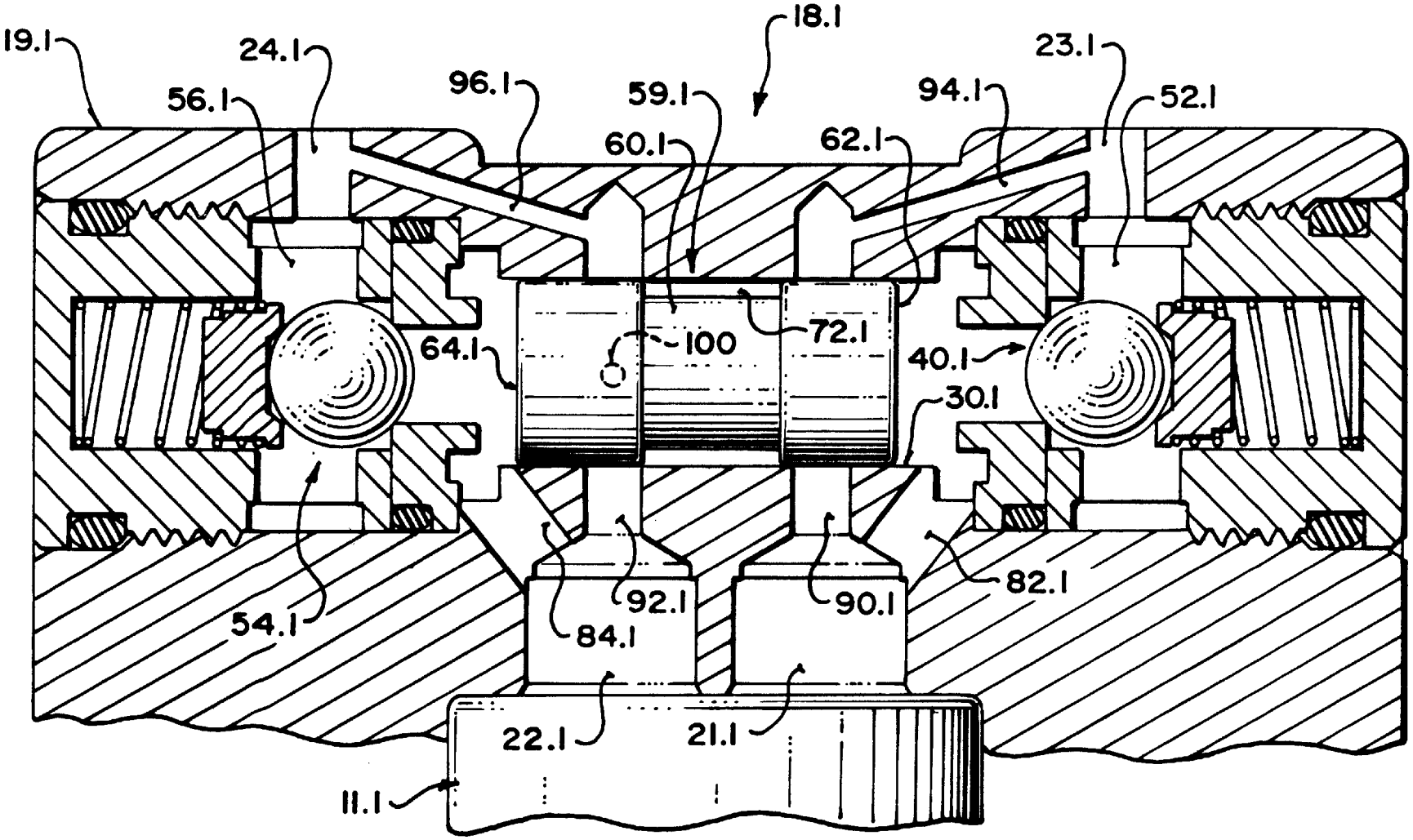
FIG. 4 is a sectional view of a lock valve according to a second embodiment of the invention with the spool thereof partly broken away.

A variation of the lock valve is shown in FIG. 4. Like pants have like numbers with "0.1" added. Valve 18.1 differs from valve 18 in one significant way; there are no protrusions on valve spool 60.1. Thus the return flow of hydraulic fluid from the cylinder passes entirely through passageways 96.1 and 92.1 or 94.1 and 90.1, depending upon the direction the boat is steered. [Cheek] *Check* valves 40.1 and 54.1 are unseated only for fluid flow from port 21.1 to port 23.1 and from port 22.1 to port 24.1 respectively. To avoid pressurization of the fluid reservoir (not shown), this embodiment has a vent passageway 100 in line with passageways 92.1 and 96.1. This vent passageway is connected to the reservoir and allows excess pressure to vent only when there is a return flow from passageway 96.1 to passageway 92.1. This vent passageway should preferably be on the side of the lock valve not normally receiving the prevailing [lead] *load*. The vent may have an orifice of up to 0.04" diameter in this embodiment.

Figure 5:
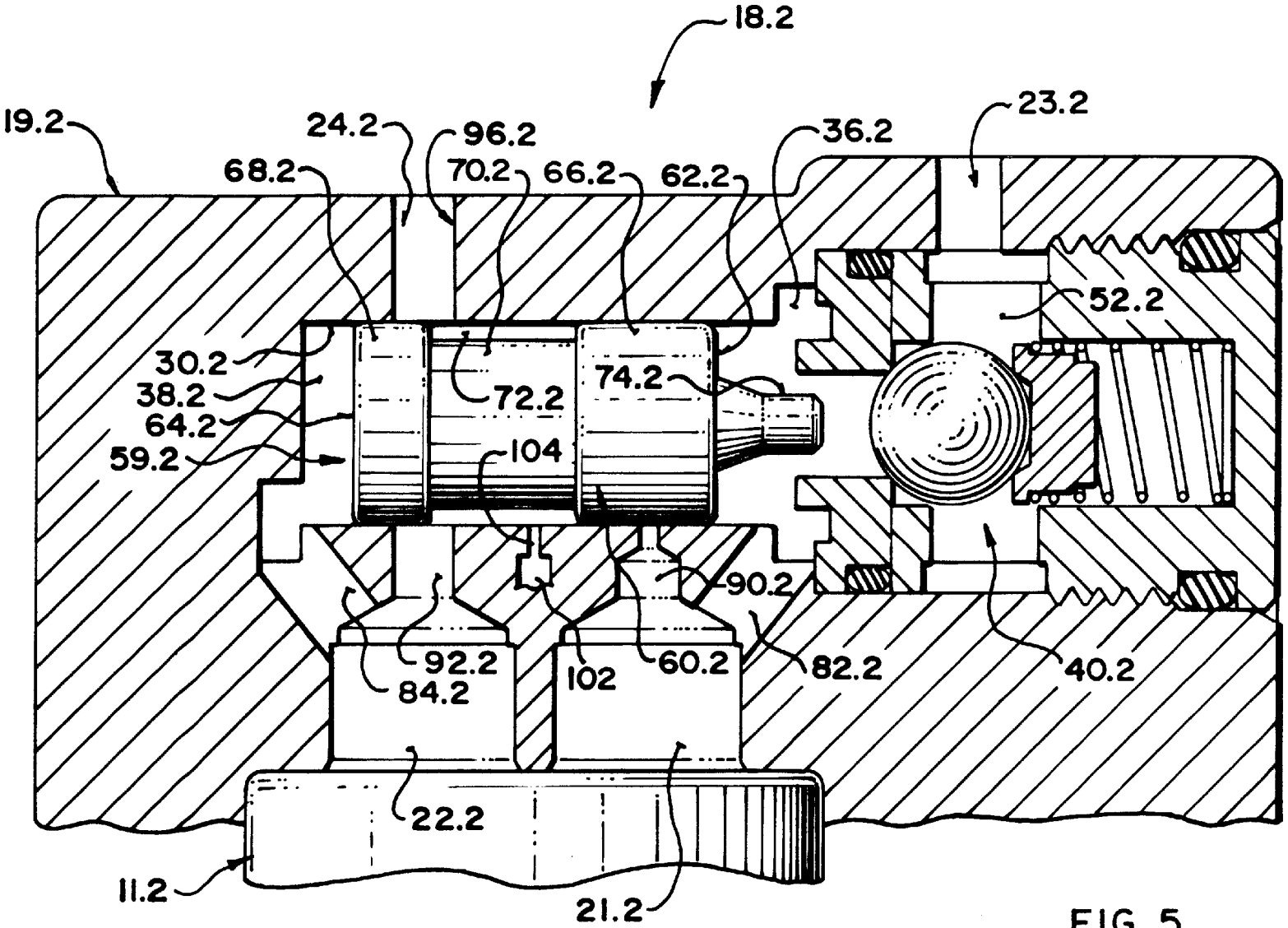
FIG. 5 is sectional view of a lock valve according to a third embodiment of the invention.

Another alternative embodiment is shown in FIG. 5 where like parts have like numbers as in FIG. 3 with the addition of "0.2". In this embodiment, the right side of the valve, from the point of view of the draping, is essentially conventional. The left side in this embodiment completely does away with a ball valve. Valve spool 60.2 has a protrusion 74.2 on one end thereof only, that end being the first end which is adjacent check valve 40.2. When port 21.2 is pressurized, the spool is shifted to the left, from the point of view of FIG. 5, until passageway 72 is aligned with passageways 92.2 and 96.2. Valve 40.2 is then unseated by the pressure of fluid in chamber 36.2 which moves through passageways 82.2 and 52.2 to port 23.2. The return fluid enters port 24.2 and passes through passageway 96.2 its bore 30.2 The fluid therefore can pass through passageway 72.2 around center portion 70.2 of valve spool 60.2 and reach port 22.2 through passageway 92.2.

When pressurized fluid is pumped to port 22.2, it applies pressure to end 64.2 of the spool at chamber 38.2. This moves the spool to the right from the point of view of FIG. 2, until projection 74.2 of the spool contacts check valve 40.2. The pressurized fluid acts against end 64.2 of the spool, forcing open check valve 40.2 and permitting a return flow of fluid through port 23.2, passageway 52.2, chamber 36.2 and passageway 82.2 to port 21.2. Once this return flow path is established, passageways 96.2 and 92.2 thus are uncovered to the left of the spool, allowing discharge fluid to travel out port 24.2 to cylinder 18.

In order to vent excess pressure, this embodiment has a vent passageway 102 which communicates centrally on bore 30.2 via orifice 104. This allows excess pressure to slowly bleed to the reservoir (not shown). This orifice is 0.02" in diameter in this embodiment. Preferably the embodiment of FIG. 2 and 3 also has a vent passageway similar to this one or the passageway 100 of FIG. 4.

The embodiment of FIG. 3 relies upon pressure equalization to center the spool after the helm is released. In some alternative embodiments the spool can be centered by the use of springs, such as coil springs at each end of the valve spool.

It will be understood by someone skilled in the art that many of the details described above are by way of example only and can be altered or deleted without departing from the scope of the invention which is to be interpreted with reference to the following claims.

What is claimed:

[1. A lock valve apparatus, comprising lock valve body (19, 19.1, 19.2) having a bore (30, 30.1, 30.2) therein, a first port (21, 21.1, 21.2), a second port (22, 22.1, 22.2), a third port (23, 23.1, 23.2) and a fourth port (24, 24.1, 24.2);

a spool valve (59, 59.1,5 9.2) having a spool (60, 60.1, 60.2) reciprocatingly received in the bore;

first means (60, 40, 54, 60.1, 54.1, 60.2, 40.2) in the lock valve body for normally preventing fluid flowing between the ports;

second means (40, 40.1, 40.2) for permitting a fluid flow from the first port to the third port when the first port is pressurized, the second means including a first one way valve disposed operatively between the first port and the third port;

third means (54, 54.1, 92.2, 84.2, 72.2, 38.2, 96.2) for permitting a fluid flow front the second port to the fourth port when the second port is pressurized, the third means including a second one way valve (54, 54.1) disposed operatively between the second port and the fourth port;

fourth means (96, 96.1, 96.2, 72, 72.1, 72.2, 92, 92.1, 92.2) for permitting a return flow of fluid from the fourth port to the second port when the first port is pressurized, the fourth means including a passageway (82, 82.1, 82.2) extending from the first port to the bore adjacent one end (62, 62.1, 62.2) of the spool, whereby the spool is shifted in a first direction as the first port is pressurized, and a passageway (72, 72.1, 72.2) in the spool valve which interconnects passageways (96, 96.1, 96.2, 92, 92.1, 92.2) through the bore when the spool is shifted in the first direction;

fifth means (94, 94.1, 72, 72.1, 90, 90.1, 74.2, 40.2, 52.2) for permitting a return flow of fluid from the third port to the first port when the second port is pressurized, the fifth means including a passageway (84, 84.1) extending from the second port to the bore adjacent another end (64, 64.1) of the spool, whereby the spool is shifted in a second direction when the second port is pressurized, a passageway in the spool valve (72, 72.1) which interconnects passageways (94, 94.1, 90, 90.1) through the bore when the spool is so shifted in the second direction, and means (74, 74.2) on the valve spool for contacting the first one way valve to unseat said first valve when the spool is shifted towards said first valve; and at least one of said means for permitting a return flow including passageways (96, 96.1, 96.2, 92, 92.1, 92.2) normally blocked by the spool which are uncovered when the spool is deflected by pressurized fluid.]

[2. A valve apparatus as claimed in claim 1, wherein the fourth means further includes means (80) on the valve spool for contacting the second one way valve to unseat said second valve when the spool is shifted towards said second valve.]

[3. A valve apparatus as claimed in claim 2, wherein the spool has two ends, the means on the valve spool including projections (74, 80) on each end of the spool, the protrusions being spaced-apart from the one-way valves when the spool is centered there between.]

4. A hydraulic system, comprising:

a reversible, manual pump (11) having two pump ports (15, 17); and a lock valve (18, 18.1, 18.2) having a body (19, 19.1, 19.2) with a bore (30, 30.1, 30.2) having a valve spool (60, 60.1, 60.2) reciprocatingly received therein, a first port (21, 21.1, 21.2, hydraulically connected to one said pump port (15), a second port (22, 22.1, 22.2) connected to another said pump port (17), a third port (23, 23.1, 23.2), a fourth port (24, 24.1, 24.2), first means (40, 40.1, 40.2) for permitting a fluid flow from the first port to the third port when the first port is pressurized, second means (84, 84.1, 84.2, 94, 94.1, 72, 72.1, 90, 90.1, 74.2, 40.2, 52.2) for permitting a fluid flow from the third port to the first port only when the second port is pressurized, the second means including a fourth passageway having a first portion (94, 94.1) extending from the third port to the bore and a second portion (90, 90.1) extending from the bore to the first port, the spool normally blocking fluid flow between the two portions of the fourth passageway, the spool having a passageway which interconnects the two portions of the fourth passageway when the spool is shifted in a direction opposite said one direction, and a fifth passageway (84, 84.1) extending from the second port to the bore adjacent a second end of the spool (64, 64.1) to shift the spool in said opposite direction when the second port is pressurized, third means (84, 84.1, 84.2. 54, 54.1, 56, 56.1, 38.2, 92.2, 96.2) for permitting a fluid flow from the second port to the fourth port when the second port is pressurized, the third means including a sixth passageway (84, 84.1, 56, 56.1) between the second port and the fourth port with a one way valve (54, 54.1) therein, fourth means (82, 82.1, 82.2, 60 60.1, 60.2, 96, 96.1, 96.2, 72, 72.1, 72.2, 92, 92.1, 92.2, 84.2, for permitting a fluid flow from the fourth, port to the second port only when the first port is pressurized, the first means including a first passageway (52, 52.1, 52.2) between the first port and the third port and a one way valve (40, 40.1, 40.2) in the first passageway, the fourth means including a second passageway having a first portion (96, 96.1, 96.2) extending from the fourth port to the bore and a second portion (92, 92.1, 92.2) extending from the bore to the second port, the spool normally blocking fluid flow between the two portions, the spool having a passageway which interconnects the two portions of the second passageway when the spool is shifted in one direction, the fourth means further including a third passageway (82, 82.1, 82.2) extending from the first port to the bore adjacent a first end of the spool (62, 62.1, 62.2) to shift the spool in said one direction when the first port is pressurized; the one way valves being resiliently biased check valves, each said check valve being adjacent one said end of the spool, the spool having end portions &4, 80) configured to open each said check valve when the spool is shifted towards said each check valve.

5. A hydraulic system as claimed in claim 4, wherein the check valve (40) in the first passageway is positioned to be opened by the spool when the spool is shifted in said opposite direction and the check valve (54) in the sixth passageway is positioned to be opened by the spool when the spool is shifted in said one direction.

6. A hydraulic system as claimed in claim 5, including means to open the fourth passageway before the check valve in the first passageway is forced open by one said end portion of the spool.

7. A system as claimed in claim 5, including means to open the second passageway before the check valve in the fifth passageway is forced open by another said end portion of the spool.

8. A lock valve, comprising:

a valve body (19);

a spool valve (59) in the body including a bore (30) with a valve spool (60) reciprocatingly received therein, the valve spool having first and second ends (62, 64) and first and second end portions (66, 68) adjacent the first and second ends respectively which sealingly engage the bore and a narrow center portion (70), providing a space (72) between the bore and the spool;

a first chamber (36) adjacent the first end of the spool;

a second chamber (38) adjacent the second end of the spool;

a first port (21);

a first passageway (82) extending between the first port and the first chamber;

a second passageway (90) extending between the first port and the bore;

a second port (22);

a third passageway (84) extending between the second port and the second chamber;

a fourth passageway (92) extending between the second port and the bore; a third port (23);

a fourth port (24);

a fifth passageway (52) extending from the first chamber to the third port;

one wall valve (40) in the fifth passageway having a valve element (42) biased towards the first chamber;

a sixth passageway (56) extending from the second chamber to the fourth port;

a one way valve (54) in the sixth passageway having a valve element (55) biased towards the second chamber;

a seventh passageway (94) between the bore and the third port, the first end portion of the spool being between the second passageway and the seventh passageway when the spool is centered, the seventh passageway communicating with the second passageway through the center portion of the spool and the bore when the spool shifts towards the first chamber; and an eighth passageway (96) extending between the bore and the fourth port, the second end portion of the spool being between the fourth passageway and the eighth passageway when the spool is centered, the eighth passageway communicating with the fourth passageway through the center portion of the spool and the bore when the spool shifts towards the second chamber.

9. A lock valve as claimed in claim 8, wherein the spool has a projection (74, 80) at each end thereof, the projections being aligned with the one way valves, whereby the fifth passageway is opened when the spool shifts towards the first chamber and the sixth passageway is opened when the spool shifts towards the second chamber.

10. A valve as claimed in claim 9, wherein the one way valves are ball valves having a valve seat (44), a ball (42, 55) and a coil spring (48) resiliently biasing the ball adjacent the seat.

11. A valve as claimed in claim 9, wherein the second and seventh passageways are connected together via the space (72) between the narrow center portion (70) of the spool and the bore (30) [primer] *prior* to one said projection (74) opening the fifth passageway.

12. A valve as claimed in claim 9, wherein the fourth and eighth passageways are connected via the space (72) between the center portion (70) of the spool and the bore (30) prior to one said projection (80) opening the sixth passageway.

*13. A lock valve apparatus comprising:*

*a lock valve body (19) having a bore (30) therein;*

*a spool (60) having first (62) and second (64) ends and reciprocatingly received in said bore (30);*

*a spool passageway (72) between said spool (60) and said bore (30);*

*a first port (21);*

*a second port (22);*

*a third port (23);*

*a fourth port (24);*

*a first passageway (82) extending from said first port (21) to said first end (62) of said spool (60) for shifting said spool (60) in a first direction when said first port (21) is pressurized;*

*a second passageway (84) extending from said second port (22) to said second end (64) of said spool (60) for shifting said spool (60) in a second direction when said second port (22) is pressurized;*

*a first one way valve (40) for permitting fluid flow from said first port (21) to said third port (23) when said first port (21) is pressurized;*

*a second one way valve (54) for permitting fluid flow from said second port (22) to said fourth port (24) when said second port (22) is pressurized;*

*a first return passage (96, 92) for returning fluid from said fourth port (24) through said bore (30) to said second port (22) through a port opened by the spool (60) independently from said second one way valve (54) and through said spool passageway (72) when said spool (60) is shifted sufficiently in said first direction to allow the fluid flow through said spool passageway (72);*

*a second return passage (94, 90) for returning fluid from said third port (23) through said bore (30) to said first port (21) through a port opened by the spool (60) independently from said first one way valve (40) and through said spool passageway (72) when said spool (60) is shifted sufficiently in said second direction to allow the fluid flow through said spool passageway (72); and*

*a first unseating means (74) on said spool (60) for unseating said first one way valve (40) in response to shifting of said spool (60) in said second direction and second unseating means (80) on said spool (60) for unseating said second one way valve (54) in response to shifting of said spool (60) in said first direction.*

*14. A lock valve apparatus as set forth in claim 13 wherein said first return passage (96, 92) includes a first return passageway (96) extending through lock valve body (19) from said fourth port (24) to said bore (30) and a second return passageway (92) extending through said lock valve body (19) from said bore (30) to said second port (22) and wherein said second return passage (94, 90) includes a third return passageway (94) extending through said lock valve body (19) from said third port (23) to said bore (30) and a fourth return passageway (90) extending through said lock valve body (19) from said bore (30) to said first port (21) thereby bypassing said one way valves (40, 54).*

*15. A lock valve apparatus as set forth in claim 13 wherein said spool (60) includes a first end portion (66) and a second end portion (68) said first (66) and second (68) end portions reciprocatingly received in said bore (30) and connected by a center portion (70) of lesser diameter than said first (66) and second (68) end portions thereby creating said spool passageway (72) between said center portion (70) and said bore (30).*

*16. A lock valve apparatus as set forth in claim 13 wherein said unseating means includes projections (74, 80) on said first (62) and second (64) ends of said spool (60) which are spaced apart from said one-way valves (40, 54) when the spool is centered therebetween.*

*17. A lock valve apparatus as set forth in claim 13 including an orifice restricted flow path (100, 104) for connecting one of said return passages to a reservoir when said spool is shifted in one of said directions.*

*18. A lock valve apparatus as set forth in claim 13 wherein said first one way valve (40) permits fluid flow from said first port (21) to said third port (23) when said first port (21) is pressurized and permits return fluid flow from said third port (23) to said first port (21) when said first unseating means (74) unseats said first one way valve (40) in response to shifting of said spool (60) in said second direction; and wherein said second one way valve (54) permits fluid flow from said second port (22) to said fourth port (24) when said second port (22) is pressurized and permits return fluid flow from said fourth port (24) to said second port (22) when said second unseating means (80) unseats said second one way valve (54) in response to shifting of said spool (60) in said first direction.*

*19. A lock valve apparatus comprising:*

*a lock valve body (19) having a bore (30) therein;*

*a spool (60) having first (62) and second (64) ends and reciprocatingly received in said bore (30);*

*a spool passageway (72) between said spool (60) and said bore (30);*

*a first chamber (36) adjacent said first end (62);*

*a second chamber (38) adjacent said second end (64);*

*a first port (21);*

*a second port (22);*

*a third port (23);*

*a fourth port (24);*

*a first passageway (82) extending from said first port (21) to said first chamber (36) for subjecting said first end (62) of said spool (60) to fluid pressure for shifting said spool (60) in a first direction when said first port (21) is pressurized,*

*a second passageway (84) extending from said second port (22) to said second chamber (38) for subjecting said second end (64) of said spool (60) to fluid pressure for shifting said spool (60) in a second direction when said second port (22) is pressurized,*

*a first one way valve (40) for permitting fluid flow from said first port (21) to said third port (23) when said first port (21) is pressurized;*

*a second one way valve (54) for permitting fluid flow from said second port (22) to said fourth port (24) when said second port (22) is pressurized;*

*a first return passage (96, 92) including a first return passageway (96) extending through said lock valve body (19) from said fourth port (24) to said bore (30), through said spool passageway (72), and through a second return passageway (92) extending through said lock valve body (19) from said bore (30) to said second port (22) for returning fluid from said fourth port (24) to said second port (22); said first return passage (96, 92) becoming operative when said spool (60) is shifted sufficiently in said first direction to allow the fluid flow from said first return passageway (96) to communicate with said second return passageway (92) through said spool passageway (72) thereby initially bypassing said second one way valve (54) before said second one way valve (54) opens to allow full open return; and*

*a second return passage (94, 90) including a third return passageway (94) extending through said lock valve body (19) from said third port (23) to said bore (30), through said spool passageway (72), and through a fourth return passageway (90) extending through said lock valve body (19) from said bore (30) to said first port (21) for returning fluid from said third port (23) to said first port (21); said second return passage (94, 90) becoming operative when said spool (60) is shifted sufficiently in said second direction to allow the fluid flow from said third return passageway (94) to communicate with said fourth return passageway (90) through said pool passageway (72) thereby initially bypassing said first one way valve (40) before said first one way valve (40) opens to allow full open return.*

*20. A lock valve apparatus as set forth in claim 19 including a first unseating means (74) on said spool (60) for unseating said first one way valve (40) in response to shifting of said spool (60) in said second direction and second unseating means (80) on said spool (60) for unseating said second one way valve (54) in response to shifting of said spool (60) in said first direction.*

*21. A lock valve apparatus as set forth in claim 20 wherein said unseating means includes projections (74, 80) on said first (62) and second (64) ends of said spool (60) which are spaced apart from said one-way valves (40, 54) when the spool is centered therebetween.*

*22. A lock valve apparatus as set forth in claim 19 wherein a third return passage (56, 84) includes a fifth return passageway (56) extending through said lock valve body (19) from said fourth port (24) to said second chamber (38), through said second chamber (38), and through a sixth return passage way (84) extending through said lock valve body (19) from said second chamber (38) to said second port (22) for returning fluid from said fourth port (24) to said second port (22); said third return passage (56, 84) becoming operative when said second unseating means (80) on said spool (60) unseats said second one way valve (54) in response to shifting of said spool (60) in said first direction to allow the fluid flow from said fifth return passageway (56) to communicate with said sixth return passageway (84) through said second chamber (38) subsequent to fluid flow from said fourth port (24) to said second port (22) via said first return passage (96, 92); and*

*a fourth return passage (52, 82) includes a seventh return passageway (52) extending through said lock valve body (19) from said third port (23) to said first chamber (36), through said first chamber (36), and through an eighth return passageway (82) extending through said lock valve body (19) from said first chamber (36) to said first port (21) for returning fluid from said third port (23) to said first port (21); said fourth return passage (52, 82) becoming operative when said first unseating means (74) on said spool (60) unseats said first one way valve (40) in response to shifting of said spool (60) in said second direction to allow the fluid flow from said seventh return passageway (52) to communicate with said eighth return passageway (82) through said first chamber (36) subsequent to fluid flow from said third port (23) to said first port (21) via said second return passage (94, 90).*

*23. A lock valve apparatus as set forth in claim 19 wherein said spool (60) includes a first end portion (66) and a second end portion (68) said first (66) and second (68) end portions reciprocatingly received in said bore (30) and connected by a center portion (70) of lesser diameter than said first (66) and second (68) end portions thereby creating said spool passageway (72) between said center portion (70) and said bore (30).*

*24. A lock valve apparatus as set forth in claim 19 including an orifice restricted flow path (100, 104) for connecting one of said return passages to a reservoir when said spool is shifted in one of said directions.*

*25. A lock valve apparatus as set forth in claim 19 wherein said first one way valve (40) permits fluid flow from said first port (21) to said third port (23) when said first port (21) is pressurized and permits return fluid flow from said third port (23) to said first port (21) when said first unseating means (74) unseats said first one way valve (40) in response to shifting of said spool (60) in said second direction; and wherein said second one way valve (54) permits fluid flow from said second port (22) to said fourth port (24) when said second port (22) is pressurized and permits return fluid flow from said fourth port (24) to said second port (22) when said second unseating means (80) unseats said second one way valve (54) in response to shifting of said spool (60) in said first direction.*

*26. A hydraulic system, comprising:*

*a reversible pump having a first pump port and a second pump port each said pump port either delivering fluid from the pump or receiving returning fluid to the pump;*

*a lock valve body having a bore therein;*

*a vent passageway communicating with said bore;*

*a first port hydraulically connected to said first pump port;*

*a second port hydraulically connected to said second pump port;*

*a third port hydraulically connected to a load cylinder;*

*a fourth port hydraulically connected to said load cylinder;*

*a spool reciprocatingly received in said bore, said spool having a first end and a second end and said spool having a first end portion and a second end portion wherein said second end portion moves in a first direction when pressurized fluid from said first port acts upon said first end and said first end portion moves in a second direction when pressurized fluid from said second port acts upon said second end;*

*a spool passageway between said spool and said bore;*

*a first one wall valve, resiliently biased for permitting fluid flow from said first port to said third port when said first port is pressurized;*

*a second one way valve resiliently biased for permitting fluid flow from said second port to said fourth port when said second port is pressurized;*

*a first passageway extending from said first port to said first end of said spool for shifting said spool in said first direction when said first port is pressurized,*

*a second passageway extending from said second port to said second end of said spool for shifting said spool in said second direction when said second port is pressurized,*

*a first return passage said first return passage opening to allow fluid flow from said fourth port through said bore to said second port through a port opened by the spool and through said spool passageway when said second end portion is shifted sufficiently in said first direction to allow the fluid flow through said spool passageway wherein said first return passage includes a first return passageway extending through lock valve body from said fourth port to said bore and a second return passageway extending through said lock valve body from said bore to said second port said first return passage being blocked by said second end portion when said second end portion is shifted in said second direction,*

*a second return passage, said second return passage being open to allow fluid flow from said third port through said bore to said first port through a port opened by the spool and through said spool passageway when said first end portion is shifted sufficiently in said second direction to allow the fluid flow through said spool passageway wherein said second return passage includes a third return passageway extending through said lock valve body from said third port to said bore and a fourth return passageway extending through said lock valve body from said bore to said first port said second return passage being blocked by said first end portion when said first end portion is shifted in said first direction;*

*wherein fluid returning through said first return passage is prevented from communicating with said vent passageway and fluid returning through said second return passage is prevented from communicating with said vent passageway.*

*27. A hydraulic system as set forth in claim 26 wherein said vent passageway (102) is in said lock valve body.*

*28. A hydraulic system as set forth in claim 27 wherein said vent passageway (102) communicates with said bore through an orifice (104).*

*29. A lock valve apparatus comprising;*

*a lock valve body having a bore therein;*

*a spool having first and second ends and reciprocatingly received in said bore;*

*a spool passageway between said spool and said bore;*

*a vent passageway (100, 102) communicating with said bore;*

*a first chamber adjacent said first end;*

*a second chamber adjacent said second end;*

*at least one pump port;*

*at least one cylinder port;*

*at least one passageway extending from said pump port to said first chamber for subjecting said first end of said spool to fluid pressure for shifting said spool when said pump port is pressurized,*

*at least one one way valve for permitting fluid flow from said pump port to said cylinder port when said pump port is pressurized;*

*at least one return passage including a first return passageway extending through said lock valve body from said cylinder port to said bore, through said spool passageway, and through a second return passageway extending through said lock valve body from said bore to said pump port for returning fluid from said cylinder port to said pump port; said return passage becoming operative when said spool is shifted sufficiently to allow the fluid flow from said first return passageway to communicate with said second return passageway through said spool passageway thereby initially bypassing said one way valve*

*wherein fluid returning through said return passage is prevented from flowing through said vent passageway (100, 102) when said spool has shifted sufficiently to preclude communication between said return passage and said vent passageway.*

* * * * *